Dec. 27, 1932.  S. M. LANGSTON  1,892,213
CUT-OFF MECHANISM
Filed Sept. 9, 1931

INVENTOR
Samuel M. Langston
BY
ATTORNEYS

Patented Dec. 27, 1932

1,892,213

UNITED STATES PATENT OFFICE

SAMUEL M. LANGSTON, OF WENONAH, NEW JERSEY

CUT-OFF MECHANISM

Application filed September 9, 1931. Serial No. 561,925.

It is sometimes desired to subdivide a continuous web of sheet material which is being continuously delivered, diagonally with respect to the direction of feeding of the material.

In the cutting of continuously delivered sheet material into sections, it is important that the two cooperating knives of the cutting mechanism travel in the general direction of movement of the material at the time of cutting action to effect a clean cut.

One object of the present invention is to provide an apparatus for subdividing a continuous web of sheet material into sections along diagonal lines, the cut-off mechanism being so constructed that in making the diagonal cut it travels in the direction of movement of the sheet at the instant of cutting, so that the cut-off mechanism does not interfere with the continuous feeding of the sheet.

Figure 1:
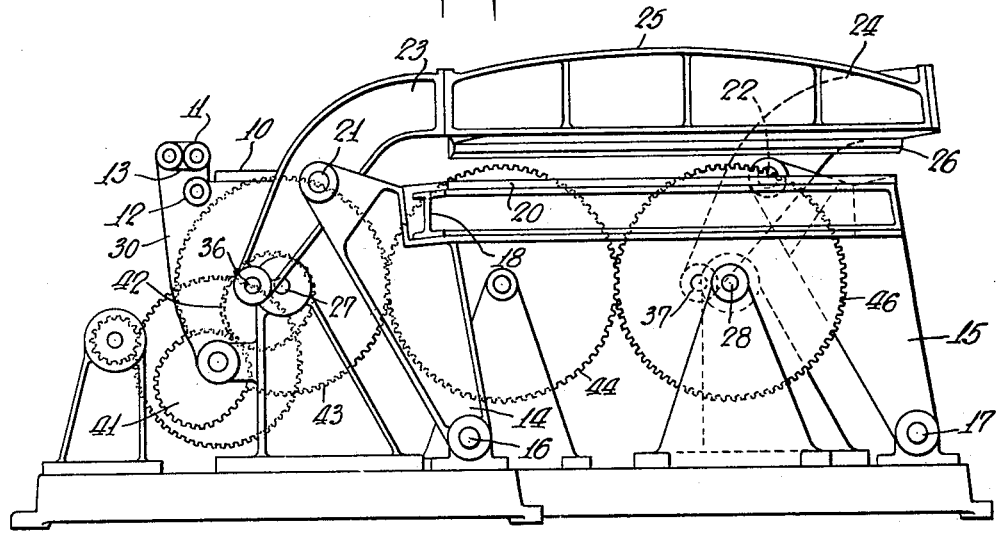
Figure 2:
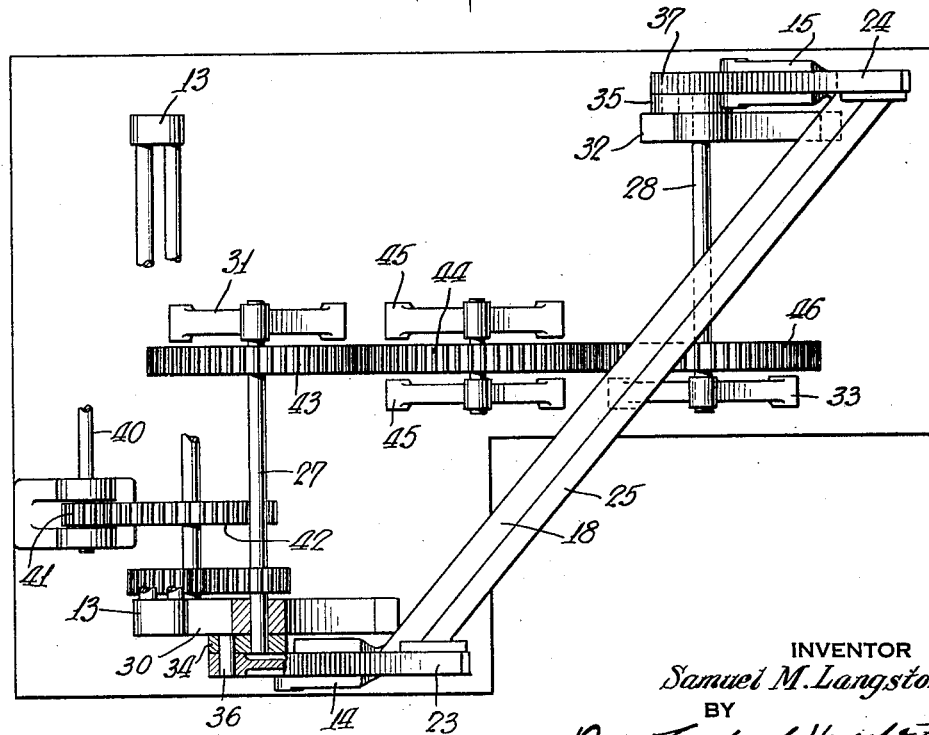

In the accompanying drawing, there is shown for the purpose of illustration, one embodiment of the present invention, in which drawing Fig. 1 is a side elevation of the machine embodying the present invention, and Fig. 2 is a top plan view of the machine partly in section.

The cut-off mechanism in connection with which the present invention is illustrated, embodies certain of the general features of the mechanism disclosed and broadly claimed in my Patent 1,359,076, in which there is provided a table or platform 10 mounted on a suitable frame structure, and cooperating with a feeding mechanism which includes a pair of rollers 11 and 12, the upper roller 11 being carried by pivoted arms 13 so that it may rest by its own weight on the advancing sheet material, or may be pressed down by suitable weights or springs. The lower roller 12 may be driven while the upper roller 11 may be driven or act as an idler.

The material is fed over the table 10 and into the field of operation of a cut-off mechanism embodying the present invention. This cut-off mechanism comprises a pair of similar upstanding arms 14 and 15 pivoted on opposite sides of the machine on a pair of pivot pins 16 and 17 respectively, these pivot pins extending parallel to the feed rollers 11 and 12, but are positioned in diagonal relationship with respect to said rollers.

The arms 14 and 15 are connected near their upper ends by a beam 18 which carries a diagonally extending knife or cutting member 20. The arms carry pivot pins 21 and 22 respectively which extend parallel to the feed rollers and which have mounted thereon similar levers 23 and 24 which at their upper front ends support a beam 25 extending diagonally with respect to the feed rollers 11 and 12 and parallel to the beam 18 and supporting the other knife or cutter 26 also extending in the same diagonal direction. The arms 14 and 15 extend substantially vertically, so that the knife 20 swings back and forth substantially horizontally, and approximately in the path of travel of the sheet.

The knives 20 and 26 are at the same distance from their respective pivot points 21 and 22 so that as the levers 23 and 24 are operated, the knife 26 moves up and down, and in its lower limiting position is slightly below the knife 20 to give a shearing cut. As the members which carry the two knives are connected by the pivot pins 21 and 22, it will be apparent that the back and forth movement of the knife 20 in the direction of travel of the sheet, will be accompanied by a corresponding back and forth movement of the knife 26. As the knife 26 also has a vertical movement, its path of travel is substantially elliptical.

For imparting the desired movement to the knives and their carrying members, there are provided transverse crank shafts 27 and 28, the shaft 27 being journaled in bearing brackets 30 and 31 and the shaft 28 in bearing brackets 32 and 33. The shafts 27 and 28 carry at their outer ends similar cranks 34 and 35 which have crank pins 36 and 37 respectively, mounted in bearings in the lower ends of the levers 23 and 24 and extending parallel to the feed rollers 11 and 12. These cranks 34 and 35 extend parallel to each other, and substantially at right angles with the feed rollers 11 and 12 so that they will have paths of movement in planes at right angles to said feed rollers. By rotating these cranks at the same rate of speed, the two knives 20 and 26 will move, during their cutting action, in the direction of feed of the material.

The shafts 27 and 28 may be continuously driven or may be intermittently driven by mechanism such as that shown in the Langston & Sieg Patent 1,660,844. In the construction illustrated a drive shaft 40 drives the shaft 27 through a pair of intermeshing elliptic gears 41 and 42 connected respectively to these shafts, these elliptic gears serving to impart to the knife 26 a speed which varies throughout the period of each cycle. These elliptic gears are arranged and proportioned to impart to the knives 20 and 26 a speed coincident with the speed of the sheet material at the instant of cutting.

In order to impart the same variable speed to the crank 28 as is imparted to the shaft 27, said shaft 27 carries a gear 43 meshing with a gear 44 mounted on a shaft supported as for instance by a pair of bearing brackets 45. This gear 44 meshes with a gear 46 secured to the shaft 28. The gears 43 and 46 are of equal size, so that the crank shaft 28 will have the same variable speed as the crank shaft 27. Any other suitable power transmitting mechanism may be employed for giving to the two parallel shafts 27 and 28 the same speed. It is seen that as the cranks 34 and 35 have paths of movement in planes parallel to the direction of the feed of the sheet material, the knives 20 and 26 will have paths of movement substantially in the same direction as the direction of feed of the material being operated on.

Having thus described my invention, what I claim as new and desire to secure by Letters Patent is:

1. In combination, feeding means for continuously advancing sheet material, a pair of cooperating knives extending diagonally with respect to the direction of feed of the sheet material, and means for moving said cutting knives during their cutting period back and forth in the direction of feed of said material and toward and from each other.

2. A cut-off mechanism for an advancing web, including a pair of knives extending diagonally with respect to the direction of feed of said web, a pair of parallel crank shafts extending substantially at right angles to the direction of feed of said web and spaced apart in said direction of feed and operatively connected to opposite ends of said knives, means for imparting to one of said crank shafts a speed which varies during its revolution, a train of gears between said shafts for imparting the same variable speed to the other shaft, and means responsive to the rotation of said shafts for moving the opposite ends of said knives at the same speed, and in planes extending substantially parallel to the direction of feed of said material.

3. An apparatus for subdividing a continuous web of sheet material, including feeding means for continuously advancing the web, a pair of cooperating knives extending diagonally with respect to the direction of feed of said web, a pair of crank shafts extending substantially at right angles to the direction of fed of said web and spaced apart in said direction of feed, a drive shaft, a drive connection between said drive shaft and one of said pair of crank shafts, and including a pair of intermeshing elliptic gears for imparting to said last mentioned crank shaft a variable speed during each cycle, a train of gears between said pair of crank shafts for imparting similar speeds to the two crank shafts, and connection means between said crank shafts and the ends of said knives for moving said knife ends at the same variable speed in planes parallel to the direction of feed of said material.

4. An apparatus for subdividing a continuous web of sheet material, including feeding means for continuously advancing the web, a pair of cooperating knives extending diagonally with respect to the direction of feed of said web, a pair of crank shafts extending substantially at right angles to the direction of feed of said web and spaced apart in said direction of feed, a drive shaft, a drive connection between said drive shaft and one of said pair of crank shafts, a train of gears between said pair of crank shafts for imparting similar speeds to the two crank shafts, and connection means between said crank shafts and the ends of said knives for moving said knife ends at the same speed in planes parallel to the direction of feed of said material.

5. A traveling cut-off including a pair of arms pivoted on parallel pivots at opposite sides of the path of travel of the material and at points spaced apart in said direction of travel, a knife carried by said arms and extending diagonally of said path, a second knife cooperating with the first mentioned knife and relatively movable in respect thereto, and means for swinging said arms and effecting said relative movement of said knives.

6. An apparatus for subdividing a continuous web of sheet material, including feeding means for continuously advancing the web, a pair of cooperating knives extending diagonally with respect to the direction of feed of said web, a pair of crank shafts extending substantially at right angles to the direction of feed of said web and spaced apart in said direction of feed, driving connections between said crank shafts to effect simultaneous rotation in the same direction and at the same speed, and connections between said crank shafts and the ends of said knives for moving said knive ends back and forth in the direction of said feed and toward and from each other, whereby all portions of said knives move in planes at right angles to the plane of and lengthwise of said web, and said web is cut on the diagonal during the continuous advance thereof.

7. A traveling cut-off including a pair of cooperating knives extending diagonally in respect to the direction of travel of the material to be cut, a pair of members secured to the opposite ends of one of said knives and pivoted at points spaced apart in the direction of travel of the material to be cut, and means for moving the other knife toward and from the first mentioned knife to cut the material during the movement of the first mentioned knife with and at substantially the same speed as the material.

8. A traveling cut-off including a pair of cooperating knives extending diagonally in respect to the direction of travel of the material to be cut, a pair of members for supporting the opposite ends of one of said knives, said members being movable back and forth in a direction substantially parallel to the direction of travel of the material, a second pair of members pivoted to the first mentioned pair for supporting the opposite ends of the other knife, the pivotal centers of said members being spaced apart in the direction of movement of the material, and means for effecting simultaneous back and forth movement of the first mentioned members and relative movement of the second mentioned members in respect to the first mentioned members to effect the cutting action of said knives.

9. A cut-off mechanism including a cutter, a pair of cutter carriers mounted for swinging movement back and forth to move the cutter in the general direction of the line of travel of the material to be cut, said carriers being spaced apart in the direction of movement of the material, and said cutter extending diagonally of said line of travel, a second cutter, and a pair of cutter carriers pivotally mounted on said first mentioned cutter carriers and with their pivotal centers spaced apart in the direction of the line of travel of the material, and means for effecting relative movement of said cutter carriers to move said cutters into and out of cutting position during the swinging movement of the first mentioned cutter carriers and to cut the material on a diagonal to its line of travel.

10. A traveling cut-off including a pair of knives, one disposed above and the other below the plane of travel of the material to be cut, and said knives extending at an angle to the direction of travel of said material, separate operating means for the opposite ends of said knives and movable in planes at right angles to the plane of and lengthwise of said plane of travel and spaced apart in the direction of said travel, and means for driving said operating means simultaneously to cause relative movement of said knives toward and from each other and bodily movement back and forth in the direction of travel of the material.

11. In combination, feeding means for continuously advancing a web, and cutting mechanism including a pair of knives disposed upon opposite sides of the plane of the web and relatively movable toward and from each other to effect cutting of the web, said knives coacting to cut the web in a direction at an angle to the direction of its travel, and operating means for effecting said relative movement of said knives for moving them bodily in the direction of travel of and at substantially the same speed as the web during the cutting action.

Signed at Camden in the county of Camden and State of New Jersey this 4th day of September, A. D. 1931.

SAMUEL M. LANGSTON.